US006810478B1

United States Patent
Anand et al.

(10) Patent No.: US 6,810,478 B1
(45) Date of Patent: Oct. 26, 2004

(54) SYSTEM FOR REMOTE BOOTING OF MUNTLIPLE OPERATING SYSTEMS USING CHAINED BOOTSTRAP MECHANISM IN A NETWORK

(75) Inventors: Vaijayanthimala K. Anand, Austin, TX (US); Aidon Paul Jennery, Round Rock, TX (US); Chakkalamattam Jos Paul, Austin, TX (US); James Richard Schoech, Round Rock, TX (US); Bradford Allen Stern, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 09/735,600

(22) Filed: Dec. 12, 2000

(51) Int. Cl.[7] .............................................. G06F 15/177
(52) U.S. Cl. ................................................. 713/2; 713/1
(58) Field of Search ............................... 713/1, 2, 100; 709/219, 222, 238

(56) References Cited

U.S. PATENT DOCUMENTS

| 5,068,780 A | | 11/1991 | Bruckert et al. | ............ 395/700 |
|---|---|---|---|---|
| 5,280,627 A | | 1/1994 | Flaherty et al. | ............. 385/700 |
| 5,349,643 A | * | 9/1994 | Cox et al. | ................... 713/155 |

(List continued on next page.)

FOREIGN PATENT DOCUMENTS

| GB | 2334354 A | 8/1999 | ........... G06F/9/445 |
|---|---|---|---|
| JP | 2003828 | 1/1990 | ........... G06F/9/445 |
| JP | 11-195000 | * 7/1999 | |

OTHER PUBLICATIONS

"JavaOS Multiple Boot Server (Win32) Support with Priority", Research Disclosure, Sep. 1999, UK, vol. No. 42, Issue No 425.*

(List continued on next page.)

*Primary Examiner*—Dennis M. Butler
*Assistant Examiner*—Chun Cao
(74) *Attorney, Agent, or Firm*—Duke W. Yee; Marilyn Smith Dawkins; Stephen R. Tkacs

(57) ABSTRACT

A chained bootstrap that is identified on a Boot Image Negotiation Layer (BINL) server and which is specified as the default bootstrap for the remote booting of client machines without regard to what client OS will finally be booted, is provided. The default bootstrap is downloaded as the initial bootstrap when the client sends the remote boot request to the TFTP boot server identified by the BINL server. This bootstrap then acquires a configuration file for the client from the TFTP server and determines the specific OS and associated bootstrap to download to the client. The chained bootstrap then relocates itself in memory on the client so that the actual client OS bootstrap can load and execute properly. The chained bootstrap then requests the actual client bootstrap from the TFTP server to continue the boot of the OS.

18 Claims, 2 Drawing Sheets

U.S. PATENT DOCUMENTS

| | | | | |
|---|---|---|---|---|
| 5,444,850 | A | | 8/1995 | Chang ..................... 395/200.1 |
| 5,452,454 | A | | 9/1995 | Basu .......................... 395/700 |
| 5,519,870 | A | | 5/1996 | Kannan et al. ............. 395/700 |
| 5,577,210 | A | * | 11/1996 | Abdous et al. ............. 709/219 |
| 5,680,547 | A | | 10/1997 | Chang ................... 395/200.01 |
| 5,828,888 | A | * | 10/1998 | Kozaki et al. .............. 717/170 |
| 5,960,175 | A | * | 9/1999 | Grossman et al. .......... 709/222 |
| 5,974,547 | A | | 10/1999 | Klimenko ...................... 713/2 |
| 6,003,097 | A | | 12/1999 | Richman et al. ............... 710/8 |
| 6,185,623 | B1 | * | 2/2001 | Bailey et al. ............... 709/238 |
| 6,301,612 | B1 | * | 10/2001 | Selitrennikoff et al. ..... 709/220 |
| 6,421,777 | B1 | * | 7/2002 | Pierre-Louis et al. .......... 713/2 |
| 6,490,677 | B1 | * | 12/2002 | Aguilar et al. ................. 713/1 |
| 6,532,537 | B1 | * | 3/2003 | Chen et al. ..................... 713/2 |
| 6,532,538 | B1 | * | 3/2003 | Cronk et al. ................... 713/2 |
| 6,601,096 | B1 | * | 7/2003 | Lassiter, Jr. ................. 709/222 |
| 6,601,166 | B1 | * | 7/2003 | Ayyar et al. .................... 713/2 |
| 6,684,326 | B1 | * | 1/2004 | Cromer et al. ................. 713/2 |
| 6,687,820 | B2 | * | 2/2004 | French et al. .................. 713/2 |
| 6,735,692 | B1 | * | 5/2004 | Murphrey et al. ............. 713/1 |

OTHER PUBLICATIONS

"Secure Remote Configuration for Networked Computer Systems", IBM Technical Disclosure Bulletin, Jan. 1998, vol. 41, p 653–656.*

IBM Technical Disclosure Bulletin, *LAN Transport Support for OS/2 2.0 Maintenance System and Configuration/Installation/Distribution*, vol. 37, No. 04B, Apr. 1994, pp. 81–82.

*Preboot Execution Environment (PXE) Specification*, Version 2.1, Sep. 20, 1999, Intel Corporation.

* cited by examiner

SYSTEM FOR REMOTE BOOTING OF MUNTLIPLE OPERATING SYSTEMS USING CHAINED BOOTSTRAP MECHANISM IN A NETWORK

BACKGROUND OF THE INVENTION

1. Technical Field

The present invention relates to client computers that are bootable over a network and, in particular, to the remote booting of multiple operating systems by those client computers.

2. Description of Related Art

Some current personal computer motherboards, network adapters, and boot diskettes include support for the preboot execution environment (PXE) to download an operating system (OS) from the network. PXE relies on extensions to the bootstrap protocol (BOOTP) and dynamic host configuration protocol (DHCP) to identify the source of the OS. PXE uses the trivial file transfer protocol (TFTP) to download the OS. PXE also requires the services of a DHCP server, a PXE proxy server, a boot image negotiation layer (BINL) server and a TFTP server.

BOOTP is a protocol that operates on networks that can also operate the transmission control protocol/Internet protocol (TCP/IP). BOOTP was developed to be used by a diskless workstation or network computer (NC) to obtain its own IP address, the IP address of a boot server, and the name of the file on that boot server that the client could request to start the download of its OS. Upon startup, the client station sends out a BOOTP request to the BOOTP server, which returns the required information. The BOOTP request and response use an IP broadcast function that can send messages before a specific IP address is known. BOOTP requires that an IP address be manually pre-assigned to each client when the BOOTP server is configured. Only one OS file name can be entered when the BOOTP server is configured, so all clients must receive the same OS. The software that transfers the OS files to the client must run on the same physical server as the BOOTP server software that supplies the IP addresses and OS file name information to the client.

DHCP is a protocol based on the BOOTP protocol that was developed to offer improved flexibility for the configuration of computers attached to a network. DHCP servers operate software that automatically assigns IP addresses to client stations logging onto a TCP/IP network. DHCP eliminates having to manually assign permanent IP addresses to clients.

PXE extensions added to the DHCP protocol enables DHCP to redirect client stations that need to be booted to a BINL server to obtain boot information, permitting client configuration and client boot to be administered separately. In fact, two different servers can respond to the initial DHCP request from a client. A "standard" DHCP server offers the client an IP address. A proxy DHCP, also called a "PXE proxy" server, redirects the client to a BINL server.

The BINL server references the address of a TFTP boot server and the name of the file to request from the TFTP boot server that contains a network bootstrap program (NBP). The client communicates with the BINL server using DHCP-formatted messages.

PXE enables a client network computer that lacks a native operating system to locate and identify an NBP through a network attachment using DHCP and its extensions. PXE also enables the client network computer to acquire the NBP from the TFTP server through that network attachment. PXE also provides a means for running the NBP on the client to continue the network acquisition of additional software required to make the client capable of performing the more complex and useful tasks assigned to it by an enterprise.

A facilitating property of DHCP is that the client does not initially need the address of any other computer. The client performs a DHCP broadcast to discover any DHCP server or PXE proxy server that can recognize that the client is PXE-capable. The DHCP server or PXE proxy server sends a DHCP offer to the client, which contains the address of the BINL server. The client then sends a BINL request to the BINL server. The BINL server returns a BINL reply that references the address of a TFTP boot server and the name of a file from which the client may obtain the NBP. The client then obtains the NBP and all necessary software from the boot server via TFTP.

Current approaches to selecting the operating system to boot on a target client have a dependency on the BINL server which is delivered by multiple vendors, such as Intel, IBM and Microsoft, with different implementations and behaviors on each platform. When attempting to manage the remote boot of multiple operating systems there is the problem of how to seamlessly switch bootstraps that are specific to each operating system without having to write a lot of unique code per BINL server per platform per vendor to concurrently switch the bootstrap file name that is referenced in the BINL server's configuration. In addition, several of these BINL servers have to be stopped and restarted after every configuration change. This is an expensive process, is platform specific, and also affects the production clients which depend on a running BINL server in order to remote boot correctly.

Therefore, a method to remote boot multiple operating systems without having to reconfigure the BINL server for each change in a client operating system would be desirable.

SUMMARY OF THE INVENTION

The present invention provides a chained bootstrap that is identified on a Boot Image Negotiation Layer (BINL) server and which is specified as the default bootstrap for the remote booting of client machines. The default bootstrap is downloaded as the initial bootstrap when the client sends the remote boot request to the TFTP boot server identified by the BINL server. This bootstrap then acquires a configuration file for the client from the TFTP server and determines the specific OS and associated bootstrap to download to the client. The chained bootstrap then relocates itself in memory on the client so that the actual client OS bootstrap can load and execute properly. The chained bootstrap then requests the actual client OS bootstrap from the TFTP server to continue the boot of the OS.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with accompanying drawings, wherein:

DETAILED DESCRIPTION OF THE PREFERRED EMBODIMENT

Figure 1:
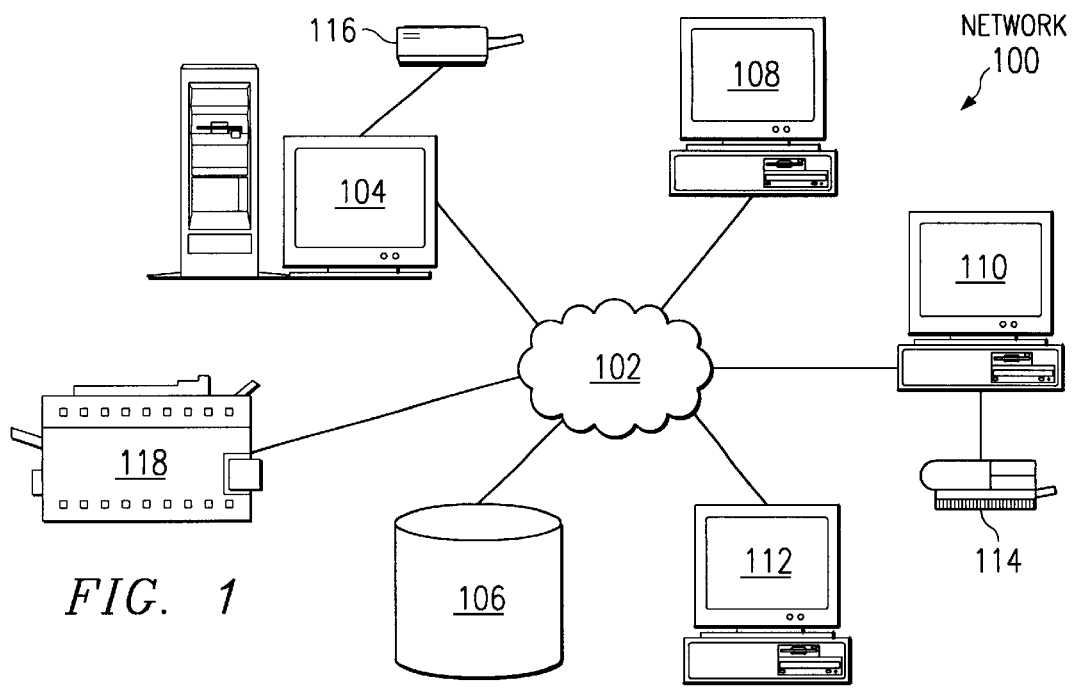
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

The present invention provides a network environment, which may include DHCP/PXE proxy servers, such as servers 104, 105, and multiple boot servers running BINL and TFTP server software, which may be collocated on servers 104, 105 with the DHCP/PXE proxy servers. A client computer, such as one of clients 108, 110, 112, includes pre-boot extensions to download operating system information from a boot server.

Figure 2:
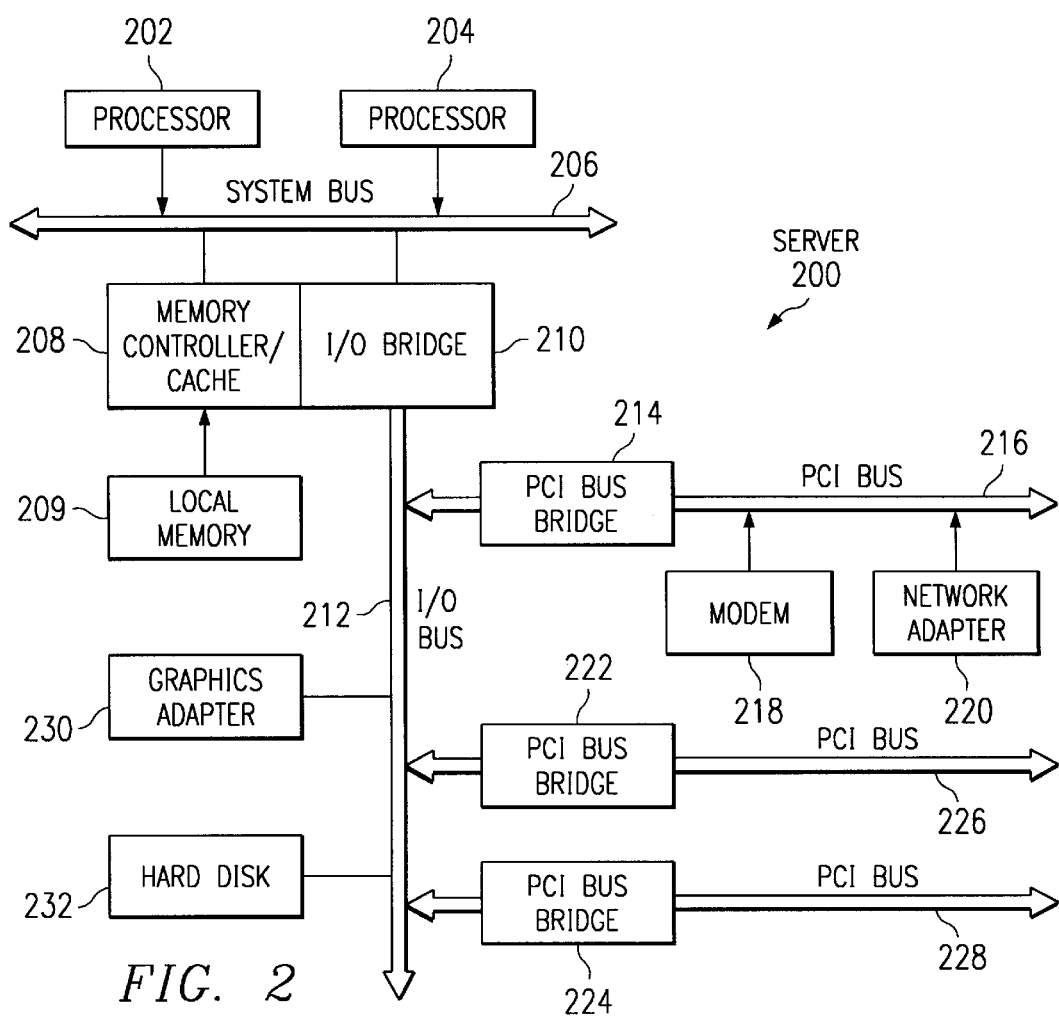
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
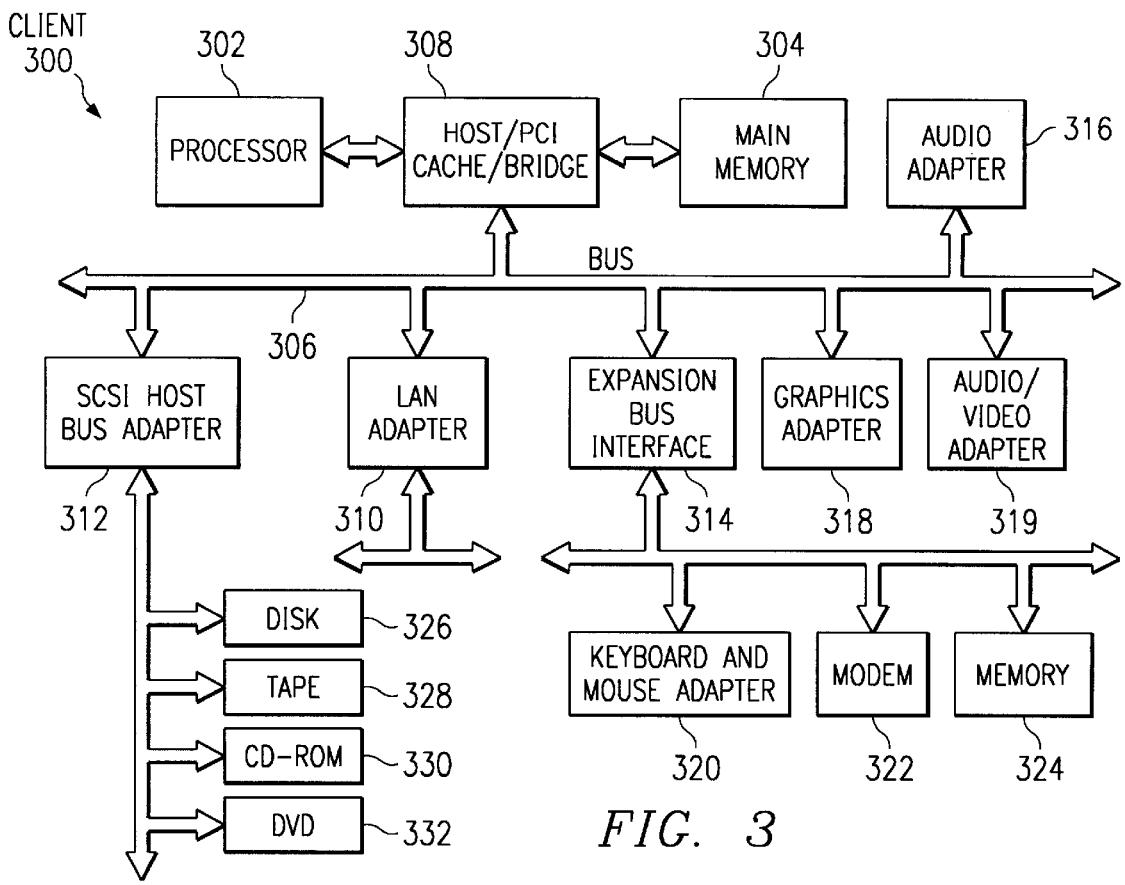
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
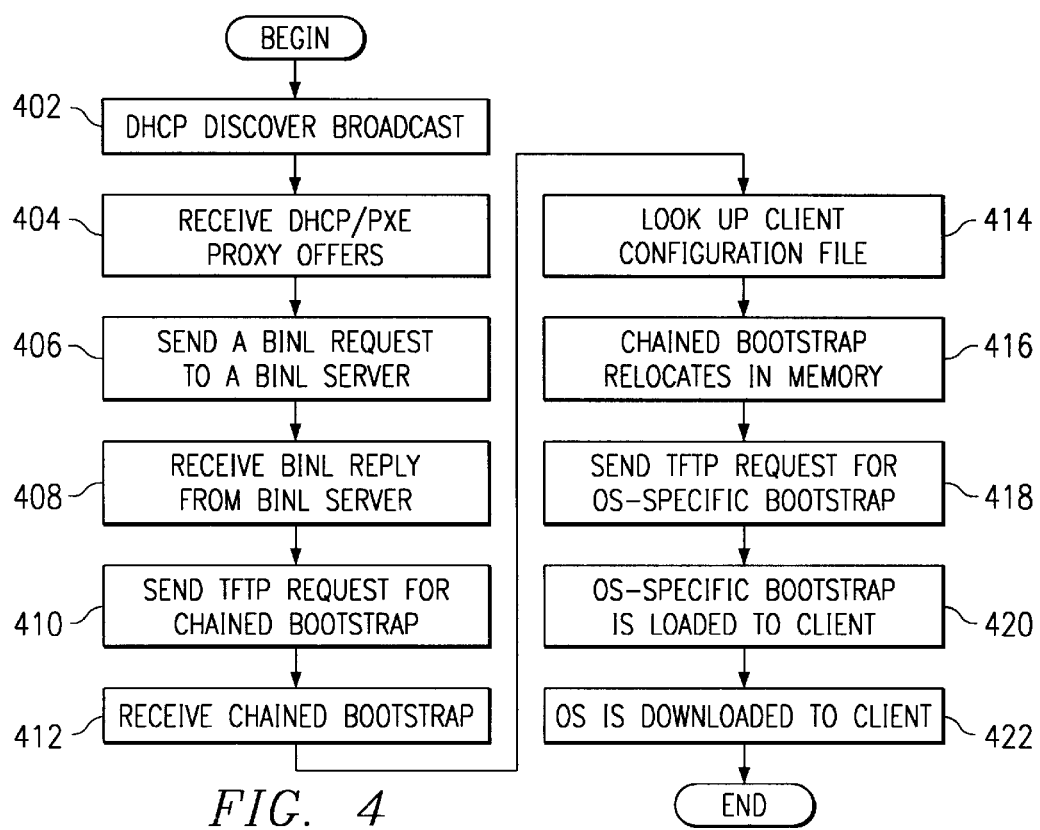
FIG. 4 depicts a flowchart illustrating the operation of a chained bootstrap for the remote booting of multiple operating systems, in accordance with the present invention.

With reference now to FIG. 4, a flowchart illustrating the operation of a chained bootstrap for the remote booting of multiple operating systems is depicted in accordance with the present invention. The process begins and sends a DHCP broadcast (step 402). Thereafter, the process receives DHCP/PXE proxy offers (step 404) and sends a BINL request to a BINL server (step 406). Then, the process receives a BINL reply from the BINL server (step 408) indicating the IP address of a TFTP server and the name of a file that contains the initial NBP.

The process then sends a TFTP request for the initial NBP file (step 410) to the TFTP boot server indicated in the BINL reply, and receives the initial NBP file from the boot server (step 412). This NBP file is a chained bootstrap, which is specified once as the default bootstrap. This bootstrap is always the first bootstrap loaded on the target client machine. A reference to this bootstrap is the only entry in the BINL server.

Next, the chained bootstrap looks for the client's configuration information file on the TFTP server (step 414) to determine which actual OS, and its associated bootstrap, should be downloaded to the target client. The configuration file is written into a client-specific directory (one per MAC address), and contains location information for and name of the target OS bootstrap. This configuration file is managed by a separate system, such as, for example, IBM's Workspace On-Demand, making it independent of the implementation of BINL servers from different vendors.

The chained bootstrap then relocates itself on memory on the client machine (step 416) so that the actual client OS bootstrap can be loaded and execute correctly.

A TFTP request is then made for the OS-specific second bootstrap file designated in that client-specific configuration file (step 418). The OS-specific second bootstrap is loaded to the client (step 420) and that bootstrap processes the download of the OS to the client (step 422).

BINL servers are supposed to provide a mechanism to identify different boot images to a target client. Unfortunately, this solution is BINL vendor-specific. The advantage of the present invention is that the BINL server has to be configured only once. The BINL configuration does not change whenever client OS changes are made for any client, or when new OS's are added. This allows the default bootstrap to chain itself (interpose itself in front of) the actual client OS bootstrap. This solves both the knowledge problem in configuring the BINL server, the restart problem, and the BINL availability problem mentioned above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for remote booting multiple operating systems within a computer network, comprising:

creating a default bootstrap program for the computer network;

loading the default bootstrap program onto a client machine requesting a remote boot from a network server;

using the default bootstrap program to access a client-specific configuration file to determine an operating system assigned to the client machine; and loading and executing an operating system specific bootstrap program for the operating system assigned to the client machine.

2. The method according to claim 1, wherein the default bootstrap program is identified on a Boot Image Negotiation Layer (BINL) server.

3. The method according to claim 2, wherein a server infrastructure that manages remote booting is independent of a vendor source of the BINL server.

4. The method according to claim 1, wherein the default bootstrap program is always a first bootstrap program loaded on a target client machine irrespective of an operating system that will ultimately be booted.

5. The method according to claim 1, wherein the client-specific configuration file is stored on a network server.

6. The method according to claim 1, further comprising relocating the default bootstrap program in a memory of the client machine in order to facilitate the operating system specific bootstrap program.

7. A computer program product in a computer readable medium for use in a data processing system for remote booting multiple operating systems within a computer network, the computer program product comprising:

instructions for creating a default bootstrap program for the computer network;

instructions for loading the default bootstrap program onto a client machine requesting a remote boot from a network server;

instructions for using the default bootstrap program to access a client-specific configuration file to determine an operating system assigned to the client machine; and instructions for loading and executing an operating system specific bootstrap program for the operating system assigned to the client.

8. The computer program product according to claim 7, wherein the default bootstrap program is identified on a Boot Image Negotiation Layer (BINL) server.

9. The computer program product according to claim 8, wherein a server infrastructure that manages remote booting is independent of a vendor source of the BINL server.

10. The computer program product according to claim 7, wherein the default bootstrap program is always a first bootstrap program loaded on a target client machine.

11. The computer program product according to claim 7, wherein the client-specific configuration file is stored on a network server.

12. The computer program product according to claim 7, further comprising instructions for relocating the default bootstrap program in a memory of the client machine in order to facilitate the operating system specific bootstrap program.

13. A system for remote booting multiple operating systems within a computer network, comprising:

means for creating a default bootstrap program for the computer network;

means for loading the default bootstrap program onto a client machine requesting a remote boot from a network server;

means for using the default bootstrap program to access a client-specific configuration file to determine a specific operating system assigned to the client machine; and means for loading and executing an operating system specific bootstrap program for the operating system assigned to the client machine.

14. The system according to claim 13, wherein the default bootstrap program is identified on a Boot Image Negotiation Layer (BINL) server.

15. The system according to claim 14, wherein a server infrastructure that manages remote booting is independent of a vendor source of the BINL server.

16. The system according to claim 13, wherein the default bootstrap program is always a first bootstrap program loaded on a target client machine.

17. The system according to claim 13, wherein the client-specific configuration file is stored on a network server.

18. The system according to claim 13, further comprising means for relocating the default bootstrap program in a memory of the client machine in order to facilitate the operating system specific bootstrap program.

* * * * *